(12) United States Patent
Wilmes (10) Patent No.: US 10,083,319 B2
(45) Date of Patent: Sep. 25, 2018

(54) PRIVACY ZONE (71) Applicant: HEWLETT-PACKARD DEVELOPMENT COMPANY, L.P., Houston, TX (US)

(72) Inventor: Edward Joseph Wilmes, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/111,538

(22) PCT Filed: Feb. 24, 2014

(86) PCT No.: PCT/US2014/017998
§ 371 (c)(1),
(2) Date: Jul. 14, 2016

(87) PCT Pub. No.: WO2015/126422
PCT Pub. Date: Aug. 27, 2015

(65) Prior Publication Data
US 2016/0364579 A1 Dec. 15, 2016

(51) Int. Cl.
*G06F 7/04* (2006.01)
*G06F 21/62* (2013.01)
(Continued)

(52) U.S. Cl.
CPC .......... *G06F 21/6245* (2013.01); *G06F 21/44* (2013.01); *H04M 1/72577* (2013.01);
(Continued)

(58) Field of Classification Search
CPC ................................................. G06F 21/6245
(Continued)

(56) References Cited

U.S. PATENT DOCUMENTS 7,080,405 B2   7/2006  Himmel et al.
8,213,962 B2 *  7/2012  Carr .................... H04B 5/0031
                                                      455/26.1
(Continued)

FOREIGN PATENT DOCUMENTS

CN   102884537   1/2013
EP    2579127    4/2013
(Continued)

OTHER PUBLICATIONS

Kotadia M., 'Privacy zone' blocks camera phones, (Web Page), Sep. 11, 2003, Retrieved Feb. 18, 2014, 2 Pages, http://www.zdnet.com/privacy-zone-blocks-cameras-phones-3039116282/.

*Primary Examiner* — Peter C Shaw
(74) *Attorney, Agent, or Firm* — HPI Patent Department (57) ABSTRACT

A method is provided in accordance with an aspect of the present disclosure. The method includes receiving and processing information from a first electronic device. The information includes at least location data, privacy zone data, and privacy distance data of the first electronic device. The method further includes calculating a current distance between the first electronic device and at least one sensor of a second electronic device, comparing the current distance with a predetermined privacy distance retrieved from the privacy distance data for the first electronic device, and determining an orientation of the at least one sensor of the second electronic device when the current distance is less than or equal to the privacy distance. The orientation is determined in relation to a privacy zone of the first electronic device. The method also includes disabling the at least one sensor of the second electronic device when the at least one sensor is oriented to point within the privacy zone of the first electronic device.

14 Claims, 5 Drawing Sheets

(51) Int. Cl.
  *H04M 1/725*    (2006.01)
  *H04W 4/02*     (2018.01)
  *G06F 21/44*    (2013.01)
  *H04W 12/02*    (2009.01)

(52) U.S. Cl.
  CPC .......... *H04W 4/023* (2013.01); *H04W 12/02* (2013.01); *G06F 2221/2111* (2013.01); *H04M 2250/10* (2013.01); *H04M 2250/12* (2013.01); *H04M 2250/52* (2013.01)

(58) Field of Classification Search
  USPC ........................................................ 726/16
  See application file for complete search history.

(56)     References Cited

U.S. PATENT DOCUMENTS

| | | | |
|---|---|---|---|
| 8,254,902 | B2 | 8/2012 | Bell et al. |
| 8,467,808 | B1 | 6/2013 | Shaw |
| 8,494,591 | B2 | 7/2013 | Bocking et al. |
| 8,508,465 | B2 | 8/2013 | Broga et al. |
| 2006/0187237 | A1 | 8/2006 | Park |
| 2007/0192910 | A1* | 8/2007 | Vu .................. B25J 5/007 700/245 |
| 2009/0015670 | A1 | 1/2009 | Gopinath et al. |
| 2009/0197584 | A1 | 8/2009 | Snow |
| 2010/0149330 | A1 | 6/2010 | Salgar et al. |
| 2011/0128384 | A1 | 6/2011 | Tiscareno et al. |
| 2013/0165080 | A1 | 6/2013 | Shaw |
| 2013/0231101 | A1 | 9/2013 | Shaw et al. |
| 2015/0358822 | A1* | 12/2015 | Hendrick .......... G06F 21/629 726/1 |

FOREIGN PATENT DOCUMENTS

| | | |
|---|---|---|
| JP | 2005269489 A | 9/2005 |
| KR | 20050029353 A | 3/2005 |

\* cited by examiner

PRIVACY ZONE

BACKGROUND

Increasing number of today's users carry or operate one, or more electronic devices that are equipped with a diverse set of functions. These devices can communicate with each other, reach the Internet, record various content, perform different tasks, or access data services through networks. Various devices such as personal computers, all in one computing devices, Internet-enabled tablets, smart phones, laptops, televisions, and gaming consoles have become essential personal accessories, connecting users to friends, work, and entertainment. Users now have more choices and expect to efficiently access and share programs, data, and other content on all types of devices at all times.

DETAILED DESCRIPTION

With the recent improvements in technology, electronic devices (e.g., tablets, laptops, display screens, smartphones, etc.) continue to play an increasing role in people's life. Different users rely on different type of electronic devices for many day-to-day activities and work related tasks. The large number of users that utilize different type of electronic devices stimulates providers to offer devices that can meet the increase in user demand, support the broad array of available services, and provide reliable communication.

Electronic devices come in different sizes, forms, and may include different technical features. Due to the proliferation of electronic devices, their technological capabilities and functions are continuously changing and increasing. Consequently, these devices also offer expanded services to their users. These electronic devices are often used to access the Internet, communicate with other devices, take pictures, record audio and/or video, and perform other personal and business related functions.

Because many of these electronic devices are mobile, users of such devices may freely move between locations and use these electronic devices at any location. Electronic devices include different hardware (e.g., cameras, microphones, GPS sensors, etc.) and software (e.g., applications, etc.) that allow users to capture different content (e.g., images, videos, audio, location, etc.) with the devices. The captured content may include images, video, etc., of different people, locations, and actions. Many times, users may capture such content secretly, without the permission of the person being photographed or recorded. Due to the expansion of wireless communication network coverage, users mss instantly share the content captured with these devices with other users or post the content to the Internet (e.g., to different social media websites).

This ability to instantly capture and share content with electronic devices creates many privacy concerns related to the privacy of the people being photographed or recorded, the privacy of the location of the recording, the privacy of any sensitive or secret material (e.g., copyrighted information, etc.) that may be recorded and shared, etc. Such privacy issues may occur under various circumstances: recording a high-level confidential meeting; taking a compromising picture of a person and sharing it with others; recording a music event that is not open for recording due to copyright issues; recording personal customer data by employees in a medical office; recording/photographing a copyrighted text, etc.

It is generally very difficult to prevent users of electronic devices from recording and sharing different content and privacy information. Requesting users to turn off their devices when they enter an area or not allowing electronic devices in that area may be an option. Displaying physical signs with messages prohibiting recording with electronic devices may also be an option. However, these alternatives are not very effective and are not usually well received by users of electronic devices.

The present description is directed to systems, methods, and computer readable media for protecting privacy by using a privacy zone. Specifically, the present description proposes an approach for creating a privacy zone around an electronic device (also called a protected device) and, thus, around a person or an object near that device. The approach proposes disabling the native recording features (e.g., recording sensors, systems, etc.) of at least one other electronic device (also called external electronic device) when at least one of its recording sensors or systems is pointed at the privacy zone of the protected device and the sensor is within a predetermined privacy distance from that privacy zone. Thus, the proposed description enables accurate, effective and efficient privacy protection of personal and confidential content.

The disclosed systems, methods, and computer readable media enable a privacy zone to be created around any electronic device (e.g., smartphone, tablet, watch, electronic keychain, screen, etc.). The specific parameters of the privacy zone may be defined and changed by a user of the electronic device at any time. The proposed systems, methods, and computer readable media also propose transmitting the location of the electronic device, privacy zone data of the electronic device (e.g., radius of the privacy zone), and a predetermined privacy distance to a plurality of external electronic devices. Each of these external electronic devices includes at least one recording sensor or recording system (e.g., camera, microphone, GPS system, etc.).

The external electronic devices may calculate the current distance between the protected electronic device and at least one sensor of the external electronic devices. That current distance is compared with the predetermined privacy distance for the protected electronic device. That way, the proposed systems, methods, and computer readable media determine whether the external electronic devices are within the predetermined distance from the privacy zone of the protected device. To assure complete efficiency and accuracy of privacy protection, the proposed systems, methods, and computer readable media determine the orientation of the at least one sensor of the external electronic devices. In other words, it is determined whether at least one sensor is pointed at the privacy zone of the protected electronic device. When a sensor of the electronic devices is pointed within the privacy zone and that sensor (i.e., and thus the device) is within the predetermined privacy distance, the sensor of the external devices is disabled. Alternatively, when a sensor of the external electronic devices is not pointed within the privacy zone or that sensor is not within the privacy distances, the sensor is not disabled and the devices may use their recording sensors.

Therefore, the proposed solution overcomes the problem of privacy protection by using a framework to determine which electronic devices point directly at the privacy zone of the protected electronic device and, therefore, may record content within the privacy zone of that device. In that case, recording sensors or systems of these devices are disabled when these devices are within the predetermined privacy distance for the protected device. There is no need to disable all electronic devices that are in a predetermined area if they don't point directly at the privacy zone. The disabled recording sensors or systems may be enabled once it is determined that the corresponding electronic device point away from the privacy zone for the device in question.

The proposed solution is designed to protect the privacy of users of electronic devices by precisely determining when the privacy may be invaded by external electronic devices. The solution offers a simple and effective way to control the external electronic devices. As explained in additional details below, the proposed functionality may be mandatory implemented in all electronic devices (e.g., by law or other government regulation) or may be enabled by a user of the electronic device. The solution determines when an electronic device is oriented towards the privacy zone of a protected device and is within a privacy distance of the protected device but not physically within the privacy zone, to disable the recording sensors of the external electronic device.

As used herein, the terms "electronic device" and "device" are too be used interchangeably and refer to any one of various smartphones, display screens, cellular telephones, tablets, personal data assistants (PDA's), laptops, computers, servers, electronic watches, electronic key chains, and other similar electronic devices that include a processor and at least one recording sensor or a system, and are capable of communicating with other electronic devices via wireless or wired communication networks.

In the following detailed description, reference is made to the accompanying drawings, which form a part hereof, and in which is shown by way of illustration specific examples in which the disclosed subject matter may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. It should also be noted that a plurality of hardware and software based devices, as well as a plurality of different structural components may be used to implement the disclosed methods and systems.

Figure 1:
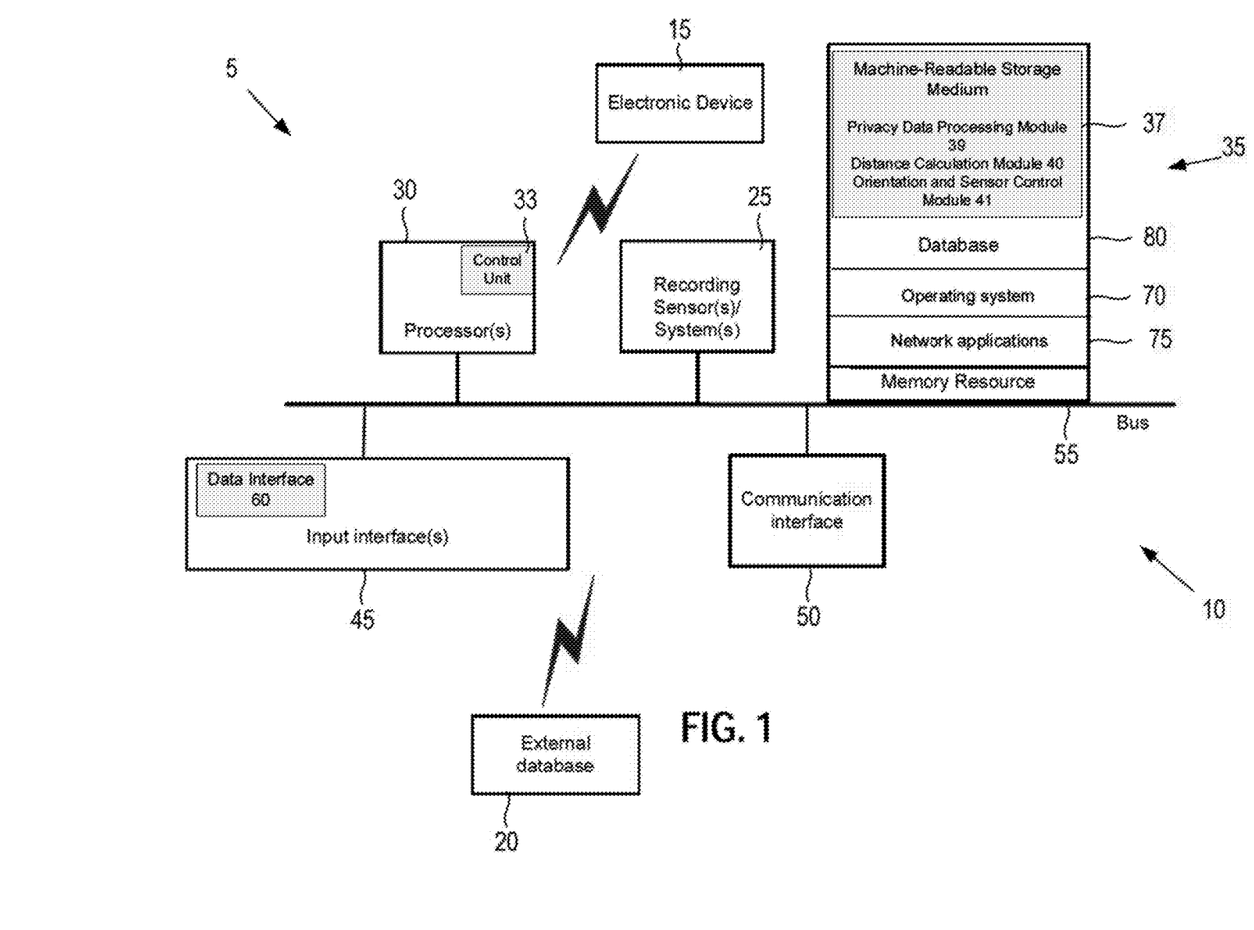
FIG. 1 is a schematic illustration of an example of a system for privacy protection using a privacy zone in accordance with an implementation of the present disclosure.

FIG. 1 is a schematic illustration of an example of a system 5 for privacy protection using a privacy zone. The system 5 includes at least one electronic device 10 capable of communicating with other electronic devices and carrying out the techniques described below. It is to be understood that the techniques described in relation to the device 10 may be implemented with any other electronic device of the system 5. The electronic device 10 can be a tablet, a laptop, a personal computer, an all in one computing device, a gaming console, a server, a smartphone, a music player, a visual player, a personal digital assistant (PDA), a cellular telephone, an electronic notepad, a plurality of distributed computing devices, or any other suitable electronic device that includes a processor and at least one recording sensor or a system. In the illustrated example, the electronic device 10 includes at least one recoding sensor or system 25, at least one processing device 30 (also called a processor), a memory resource 35, input interface(s) 45, and communication interface 50. In other examples, the electronic device 10 includes additional, fewer, or different components for carrying out the functionality described herein.

As explained in additional detail below, the electronic device 10 includes software, hardware, or a suitable combination thereof configured to enable functionality of the electronic device 10 and to allow it to carry the techniques described below and to interact with the one or more systems or devices. For example, the electronic device 10 includes communication interfaces (e.g., a Wi-Fi® interface, a Bluetooth® interface, a 3G interface, a 4G interface, a near filed communication (NFC) interface, etc.) that are used to connect with other devices/systems and/or to a network (not shown). The network may include any suitable type or configuration of network to allow for communication between the electronic device 10 and any other devices/systems.

For example, the electronic device 10 can communicate with at least one electronic device 15 (e.g., a smartphone, a tablet, a key chain, a camera, an electronic watch, a computing device, a server, a plurality of distributed computing devices, or any other type of electronic device) or with an external database 20 to receive privacy formation related to the electronic device 15 or any other similar devices. The electronic device 15 is hereby referred to a protected electronic device that provides privacy protection based on a privacy zone. For example the electronic device 15 may be a mobile device, a key chain, or a watch carried by a user; a device installed on the stage of a music concert; a device installed near a copyrighted document or a new product during a presentation, etc. It is to be understood that the operations described as being performed by the electronic device 10 that are related to this description may, in some implementations, be performed or distributed between the electronic device 10 and other electronic/computing devices (not shown). In addition, the electronic device 10 may be a protected device and the device 15 may be an external device that is to be disabled.

The processing device 30 of the electronic device 10 (e.g., a central processing unit, a group of distributed processors, a microprocessor, a microcontroller, an application-specific integrated circuit (ASIC), a graphics processor, a multiprocessor, a virtual processor, a cloud processing system, or another suitable controller or programmable device), the memory resource 35, the input interfaces 45, and the communication interface 50 are operatively coupled to a bus 55.

The communication interface 50 allows the electronic device 10 to communicate with plurality of networks, communication links, and external devices. The input interfaces 45 can receive information from any other devices/systems in communication with the electronic device 10. In one example, the input interfaces 45 include at least a data interface 60. In other examples, the input interfaces 45 can include additional interfaces. In one implementation, the data interface 60 receives communications from the electronic device 15, other protected devices/systems, the external database 20, etc. The communications may include at least location data, privacy zone data, and privacy distance data for at least one protected electronic device (e.g., the device 15). In some examples, that information may be saved in an external database (e.g., 20) and sent to the electronic device 10. Alternatively, the electronic device 10 may receive the data for the at least one protected electronic device 15 by directly communicating with the device 15.

The processor 30 includes a controller 33 (also called a control unit) and be implemented using any suitable type of processing system where at least one processor executes computer-readable instructions stored in the memory 35. The memory resource 35 includes any suitable type, number, and configuration of volatile or non-transitory machine-readable storage media 37 to store instructions and data. Examples of machine-readable storage media 37 in the memory 35 include read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, an SD card, and other suitable magnetic, optical, physical, or electronic memory devices. The memory resource 35 may also be used for storing temporary variables or other intermediate information during execution of instructions to by the processor 30.

The memory 35 may also store an operating system 70 and network applications 75. The operating system 70 can be multi-user, multiprocessing, multitasking, multithreading, and real-time. The operating system 70 can also perform basic tasks such as recognizing input from input devices, such as a keyboard, a keypad, a mouse; sending output to a projector and a camera; keeping track of files and directories on memory 35; controlling peripheral devices, such as printers, image capture device; and managing traffic on the bus 55. The network applications 75 include various components for establishing and maintaining network connections, such as computer-readable instructions for implementing communication protocols including TCP/IP, HTTP, Ethernet®, USB®, and FireWire®.

Software stored on the non-transitory machine-readable storage media 37 and executed by the processor 30 includes, for example, firmware, applications, program data, filters, rules, program modules, and other executable instructions. The control unit 33 retrieves from the machine-readable storage media 37 and executes, among other things, instructions related to the control processes and methods described herein. In one example, the instructions stored in the non-transitory machine-readable storage media 37 implement a privacy data processing module 39, a distance calculation module 40, and an orientation and sensor control module 41. In other examples, the instructions can implement more or fewer modules (e.g., various other modules related to the operation of the system 5). In one example, modules 39-41 may be implemented with electronic circuitry used to carry out the functionality described below. As mentioned above, in addition or as an alternative, modules 39-41 may be implemented as a series of instructions encoded on a machine-readable storage medium and executable by a processor.

As explained in additional detail below, the privacy data processing module 39 receives and processes privacy information from a protected electronic device 15 or other protected devices. The information includes at least a location of the first electronic device, privacy zone data, and privacy distance data. The distance calculation module 40 calculates a current distance between the protected electronic device 15 and at least one sensor of the electronic device 10, and compares the current distance with a predetermined privacy distance for the protected electronic device. The orientation and sensor control module 41 determines an orientation of at least one sensor of the other electronic device, and disables the at least one sensor when the at least one sensor is oriented to point within the privacy zone of the protected electronic device 15 and the current distance is less than or equal to the privacy distance.

The recording sensor(s) and/or system(s) 25 may include various sensor or systems for recording content with the device 10 (e.g., camera sensors, microphone sensors, GPS sensors, etc.). In addition, the device 10 may include other sensors (not shown) such as: gyro sensors, accelerometers, magnetic sensors, rotating vector sensors, orientation sensors, etc. Information associated with the system 5 and other systems/devices can be stored, logged, processed, and analyzed to implement the control methods and processes described herein. For example, the memory 35 may include at least one database 80. In other example implementations, the system 5 may access external database (e.g., database 20) that may be stored remotely of the electronic device 10 (e.g., can be accessed via a network or a cloud). The database 80 or the external database 20 may store various privacy information related to protected device 15 and other protected devices.

Figure 2:
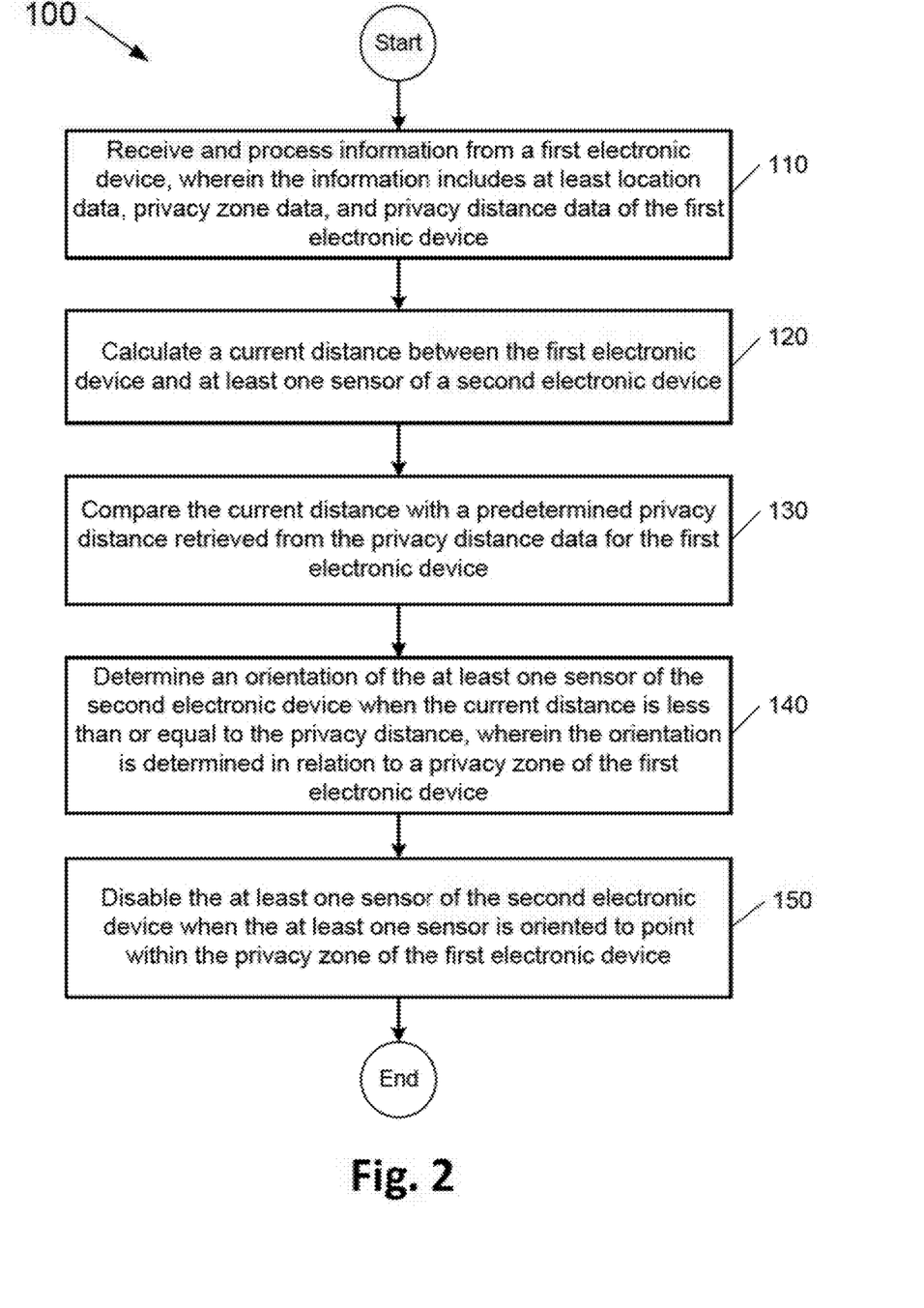
FIG. 2 illustrates a flow chart showing an example of method for privacy protection using a privacy zone in accordance with an implementation of the present disclosure.

FIG. 2 illustrates a flow chart showing an example of a method 100 for privacy protection using a privacy zone. In one example, the method 100 can be executed by the control unit 33 of the processor 30 of the electronic device 10. Various elements or blocks described herein with respect to the method 100 are capable of being executed simultaneously, in parallel, or in an order that differs from the illustrated serial manner of execution. The method 100 is also capable of being executed using additional or fewer elements than are shown in the illustrated examples.

The method 100 may be executed in the form of instructions encoded on a non-transitory machine-readable storage medium 37 executable by the processor 30 of the electronic device 10. In one example, the instructions for the method 100 implement the privacy data processing module 39, the distance calculation module 40, and the orientation and sensor control module 41. In other examples, the execution of the method 100 may be distributed between the processing device 30 and other processing devices in communication with the processing device 30. In yet another example, the method 100 may be executed on a separate device connected to the electronic device 10.

The method 100 begins at block 110, where the processor 30 receives and processes information from at least one protected electronic device (e.g., the device 15). This step may be performed by the privacy data processing module 39. The information includes at least location data, privacy zone data, and privacy distance data for the at least one protected electronic device 15. It is to be understood that the processor 30 may receive privacy information about a plurality of protected electronic devices. In one implementation, the information from the protected electronic device 15 is sent to the electronic device 10 via a communication channel (e.g., Bluetooth®, WiFi®, or any other type of radio frequency channel). Alternatively, the electronic device 10 may receive the information about the at least one electronic device 15 from any other external device or a system.

In one example, the location data for the protected device 15 includes at least location geographic coordinates (e.g., altitude A, longitude Lo, latitude La) for the electronic device 15. For instance, the device 15 may use embedded positioning sensors, orientation sensors, GPS sensors (or combination thereof) to determine an exact geographic location. As explained in additional details below, the location data for the device 15 is continuously updated and sent to other devices.

The privacy zone data includes at least information about a privacy zone of the protected electronic device 15. The privacy zone defines an area (e.g., a calculated sphere) around the electronic device 15. The area may be curved and has a predetermined radius Rs that is included in the privacy zone data from the device 15. Thus, the radius Rs is used to determine the size of the privacy zone of the device 15. The radius Rs is configurable by the user of the device 15 and can be changed by the user of the device 15 at any time.

The privacy distance data for the protected electronic device 15 includes at least predetermined privacy distance for the electronic device 15. In one example, the privacy distance is the range at which a privacy zone penetration from a recording sensor of external mobile devices can occur at the device 15. For instance, the privacy distance may include the distance between a first end (i.e., the external end) of the radius Rs of the privacy zone and the at least one of e sensors 25 of the electronic device 10. The privacy distance for the protected device 15 is configurable by the user of the device 15 and can be changed by the user of the device 15 at any time. In addition the information received from the protected electronic device 15 may also include a temporary identification (ID) for the device 15 and any other information related to the device 15. In the alternative, a temporary ID for the device 15 may be generated at the device 10. The temporary ID may include a portion of the International Mobile Station Equipment Identity or (IMEI) for the device 15, a portion of a random number, or any another unique identifier.

Each protected device may periodically broadcast (e.g., every 30 seconds, 60 seconds, etc.) or transmit the information described above to other devices. In an alternative implementation, the device 10 may receive a function equation of the privacy zone from the protected device 15 instead of the geographic coordinates of the location of the device 15. The function equation may be normalized to the protected device's altitude, longitude, and latitude geographic coordinates such that the device 10 only needs to plug in its own altitude, longitude, and latitude to generate the location of the privacy zone of the protected device 15 and to determine the distance between the device 15 and 10. That way, the calculations involved in the method 100 may be shared between the devices 10 and 15 to help to preserve power on the electronic device 10.

The device 15 (or any other protected device) may transit information to a plurality of devices that are included in the system 5 (e.g., that have downloaded an application for the system 5 or otherwise are included in the system). In that situation, these electronic devices may implement various privacy settings related to the techniques of the described method 100. For example, such privacy setting may include a "Privacy Participant" setting and a "Privacy Protection" setting. The "Privacy Participant" setting allows the recording sensors/systems 25 of the any device to be disabled when the device points at the privacy zone of a protected device. The "Privacy Protection" setting enables a device to broadcasts its geographic coordinates, temporary ID, privacy distance, privacy zone radius, etc. to other electronic devices. Once the "Privacy Protection" setting is enabled, related parameters are made available for tuning. For example, a "Privacy Zone" setting that directly determines the privacy zone radius Rs and a "Privacy Distance" setting for the privacy distance can be modified by the user of the device.

In some examples, a user of any of the participating electronic devices may have the options to turn "on" an "off" the privacy settings of these devices that are related to the described techniques For instance, when a user turns "on" the "Privacy Participant" setting, the user allows his or her device to execute the described techniques and to disable recording features of the device when the scribed criteria are met. Alternatively, these settings may be mandatory implemented in all electronic devices that include recording functionality (e.g., by law or other government regulation) such that users of such devices cannot change the settings. In that situation, all electronic devices must participate in the system 5 and may have their recording sensors/systems disabled automatically without any involvement of the user. In some implementations, the control unit 33 may periodically check whether the privacy setting for the device are enabled before it proceeds with the techniques of the method 100.

The device 10 may also receive information about a plurality of protected devices that are in the communication range of the device 10. It is to be understood that the process 100 may be implemented concurrently for more than one protected device and on more than one device that is being disabled. Each of the plurality of protected device may send location data, privacy zone data, privacy distance data, temporary ID, and any other information. Each protected device may create a new temporary ID every time the device is turned off or the "Privacy Protection" setting is enabled. In one example, the electronic device 10 may store the information for the device 15 and/or a plurality of protected devices in the database 80, the database 20, or any other database. That information may be continuously updated to provide accurate calculations of the positions of devices 15 and 10. As explained in additional details below, based on the information for the device 15, the control unit 33 determines the current distance between the devices 10 and 15, the orientation of at least one sensor of the device 10 in relation>to the privacy zone of the device 15, and disables the sensor of the device 10 when necessary.

With continued reference to FIG. 2, the control unit 33 calculates a current distance between the protected electronic device 15 and at least one sensor of the electronic device 10 (at 120). This may be performed by the distance calculation module 40. In other words, the control unit 33 determines the actual distance between the device 10 and the protected device 15 by using the location data for the device 15 and the location of the device 10 received from its internal sensors. For example, location differences (e.g., altitude, longitude, and latitude differences) between the device 10 and the device 15 are calculated such that the position of the device 15 is determined relative to the device 10.

Figure 3:
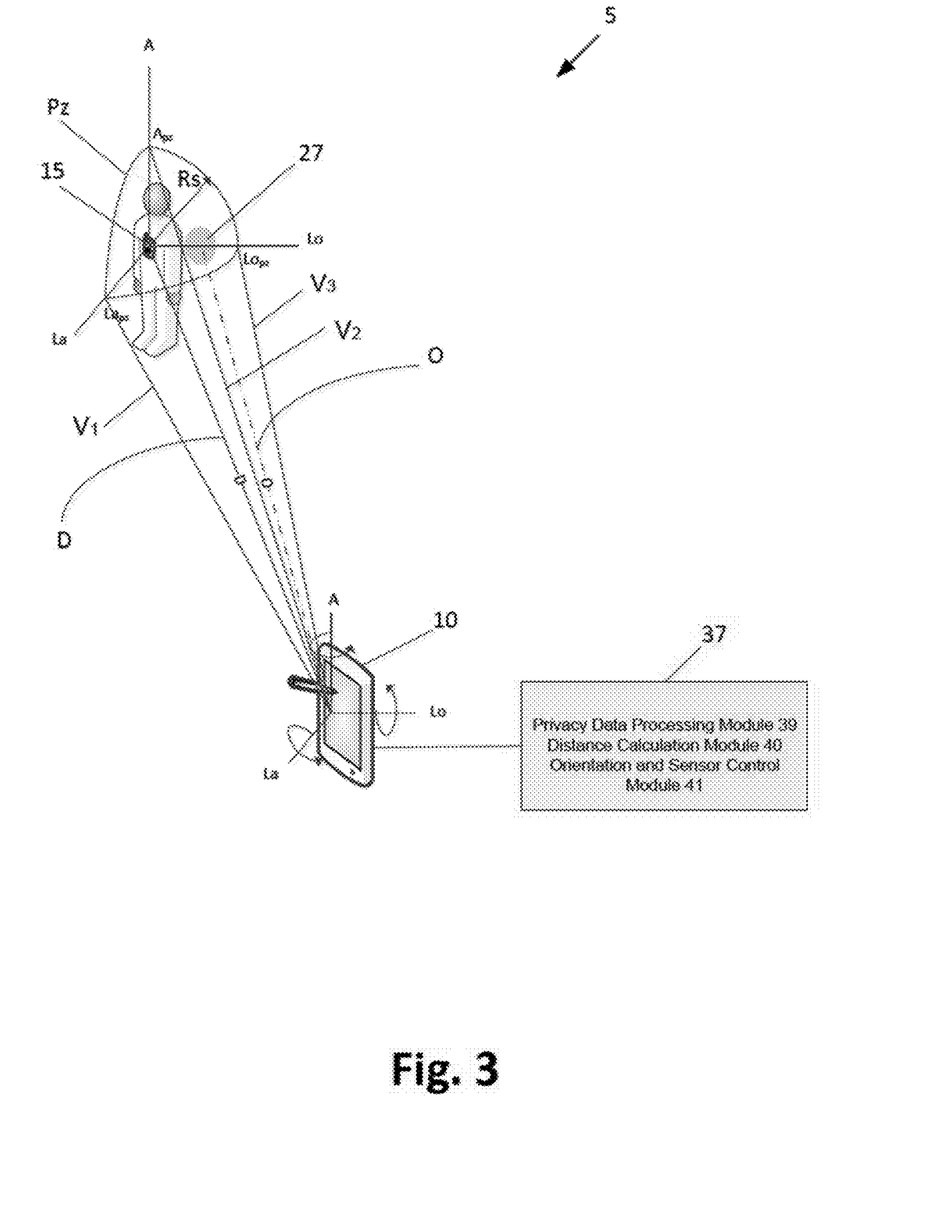
FIG. 3 is a graphical representation of an example of the system for privacy protection of FIG. 1 implementing the method of FIG. 2 in accordance with an implementation of the present disclosure.

FIG. 3 is a graphical representation of an example of the system 5 implementing the method 100. As shown in FIG. 3, in one example, the electronic device 10 generates a vector D identifying the current distance between devices 10 and 15 and the direction of the device 10 in relation to the protected device 15. The calculated vector D is associated with the ID for the device 15 and is stored (e.g. in the database 80). In addition, the control unit 33 calculates privacy boundary vectors $V_1$-$V_3$ for each axis of location (i.e., altitude, longitude, and latitude) based on the received data for the device 15 (i.e., the location of the protected device 10 and the radius Rs of the privacy zone) and the location of the device 10. In other words, by using the location of the protected device 10 and the radius Rs of the privacy zone, the control unit 33 determines a maximum privacy zone boundary for each location axis (i.e., altitude $A_{pz}$, longitude $Lo_{pz}$, latitude $La_{pz}$) to "recreate" the desired area of the privacy zone Pz of the device 15. Thus, these privacy boundary vectors $V_1$-$V_3$ are used to define or calculate the area of the privacy zone Pz around the protected electronic device 10 in relation to location of the device 15.

Next, the control unit 30 compares the current distance between at least one sensor 25 of the device 10 to the device 15 with the predetermined privacy distance retrieved from the privacy distance data for the protected electronic device 15 (at 130). As noted above, the privacy distance defines the range at which a privacy zone penetration from external mobile devices can occur at the device 15. The privacy distance may include the distance between the external end of the radius Rs of the privacy zone and the at least one of the sensors 25 (not shown on FIG. 3) of the electronic device 10. If the control unit determines that the current distance is greater than the predetermined privacy distance, the control unit 33 may stop the process 100. That means that the device 10 is outside of the range at which a privacy zone penetration for the device 15 may occur.

If, in the other hand, the control unit 33 determines that the current distance is less than or equal to the predetermined privacy distance, the control unit 33 determines the orientation of the at least one sensor of the electronic device 10 (at 140). In one implementation, the orientation of the at least one sensor is determined in relation to the privacy zone of the protected device 15. For example, determining the orientation of the at least one sensor of the second electronic device includes calculating an orientation vector O (shown in FIG. 3) for the at least one sensor of the electronic device 10. Calculating the orientation vector may include determining a fixed magnitude of the orientation vector O in relation to the privacy boundary vectors $V_1$-$V_3$ that define the area of the privacy zone. Vectors f and O may be converted to unit vectors in order to determine the exact orientation of the at least one sensor.

For example, the control unit 33 converts the privacy boundary vectors $V_1$-$V_3$ to coordinate limits (e.g., pitch (x), roll (y), and azimuth (z)) to generate the orientation vector O for the at least one sensor (or for the device 10 if more than one sensors are used simultaneously). In other words, $V_1$-$V_3$ define where the area (e.g., a sphere) of the privacy zone crosses the coordinate systems axises. It is to be understood that specific coordinate system used is not relevant to the calculation, as long as it is either normalized or is made consistent. The coordinate system may be polar, Cartesian, geographic coordinate system, etc. That way, a fixed magnitude 27 (i.e., distance, location, and direction) attached to the orientation vector O can be determined. The O vector is projected onto each of the axises and is compared to privacy boundary vectors $V_1$-$V_3$ respectively (i.e., the fixed magnitude 27 of the orientation vector O is compared to the privacy boundary vectors $V_1$-$V_3$ that define the area of the privacy zone). Axis angles between vectors O and O and the privacy boundary vectors $V_1$-$V_3$ may be calculated to determine an orientation difference between the vectors. That way, the control unit may determine whether the fixed magnitude 27 of the orientation vector O is pointed within the privacy zone (i.e., is within the maximum boundaries of the boundary vectors $V_1$-$V_3$).

As shown in FIG. 3, when fixed magnitude 27 is oriented to point within the privacy zone of the electronic device 15, the control unit 33 disables the at least one sensor 25 of the device 10 (at 150). That means that the fixed magnitude of orientation vector O for the at least one sensor falls within the privacy zone defined by the privacy boundary vectors $V_1$-$V_3$ of the device 15. In other words, the power to sensor 25 may be temporary switched off (e.g., until the system 5 determines that the sensor no longer point to the privacy zone) so that information from the sensor 25 is not generated, processed, stored, etc. If the fixed magnitude 27 is oriented to point outside the privacy zone, the control unit may not disable the recording sensor 25 even if the current distance of the device 10 to the device 15 is less than or equal to the predetermined privacy distance. It is to be understood that other techniques for determining the orientation of the at least one sensor (or the device 10) in relation to the privacy zone of the device 15 may also be used.

Alternatively, the control unit may not disable the recording sensor 25 when the sensor 25 is oriented in the direction of the privacy zone but the current distance of the device 10 to the device 15 is outside the predetermined privacy distance (e.g., it is greater). In that situation, the deice 10 is out of the range at which a privacy zone penetration from a recording sensor of the device 10 can occur at the device 15. The method 100 may be continuously executed (i.e., with updated information for the devices 10 and 15). Therefore, the control unit may enable the at least one sensor of the device 10 when the control unit determines that the fixed magnitude 27 is no longer oriented to point within the privacy zone of the electronic device 10 (i.e., the device 10 is no longer a privacy threat to the device 15). It is to be understood that the process 100 may be implemented concurrently for a plurality of electronic devices.

Figure 4A:
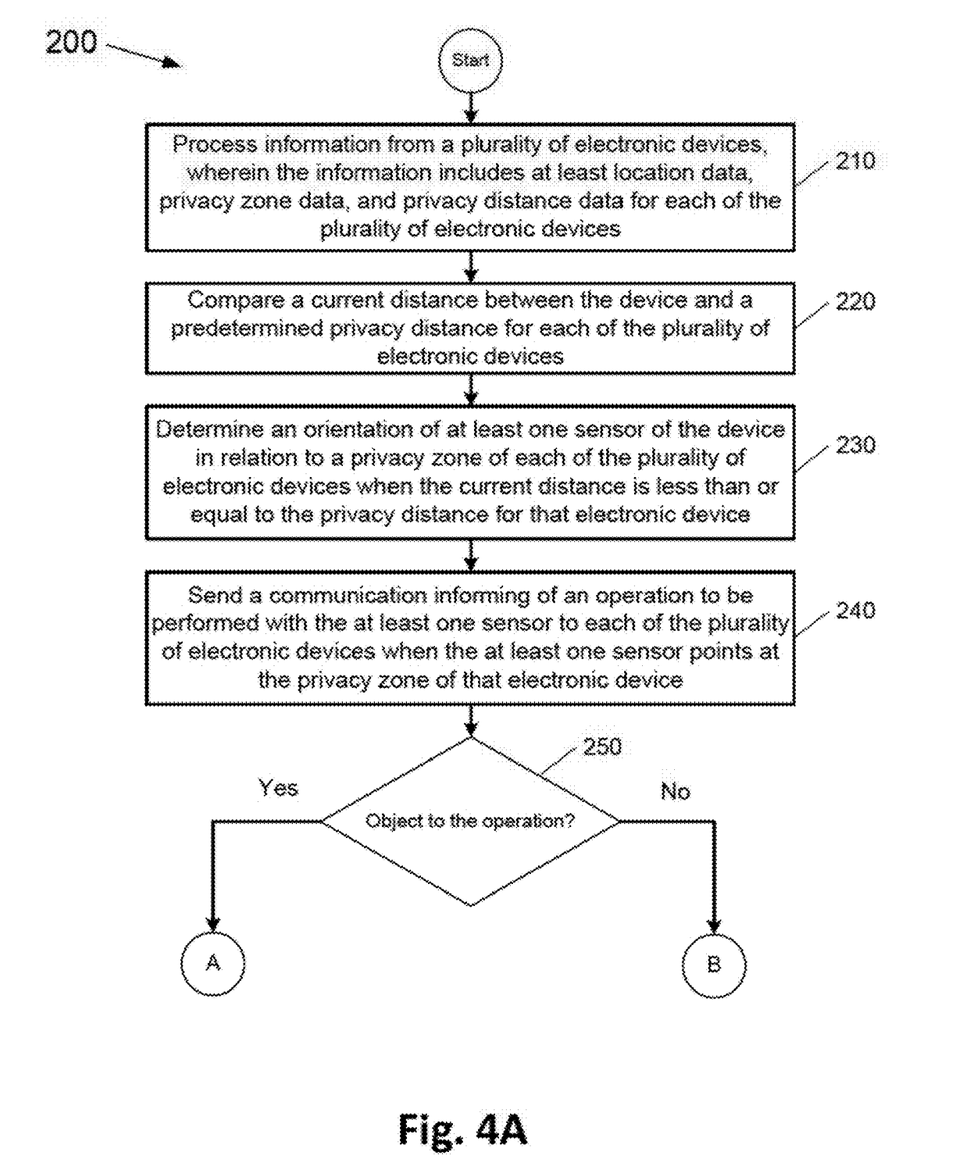
FIGS. 4A and 4B illustrate a flow chart showing an example of an alternative method for privacy protection using a privacy zone in accordance with an implementation of the present disclosure.
Figure 4B:
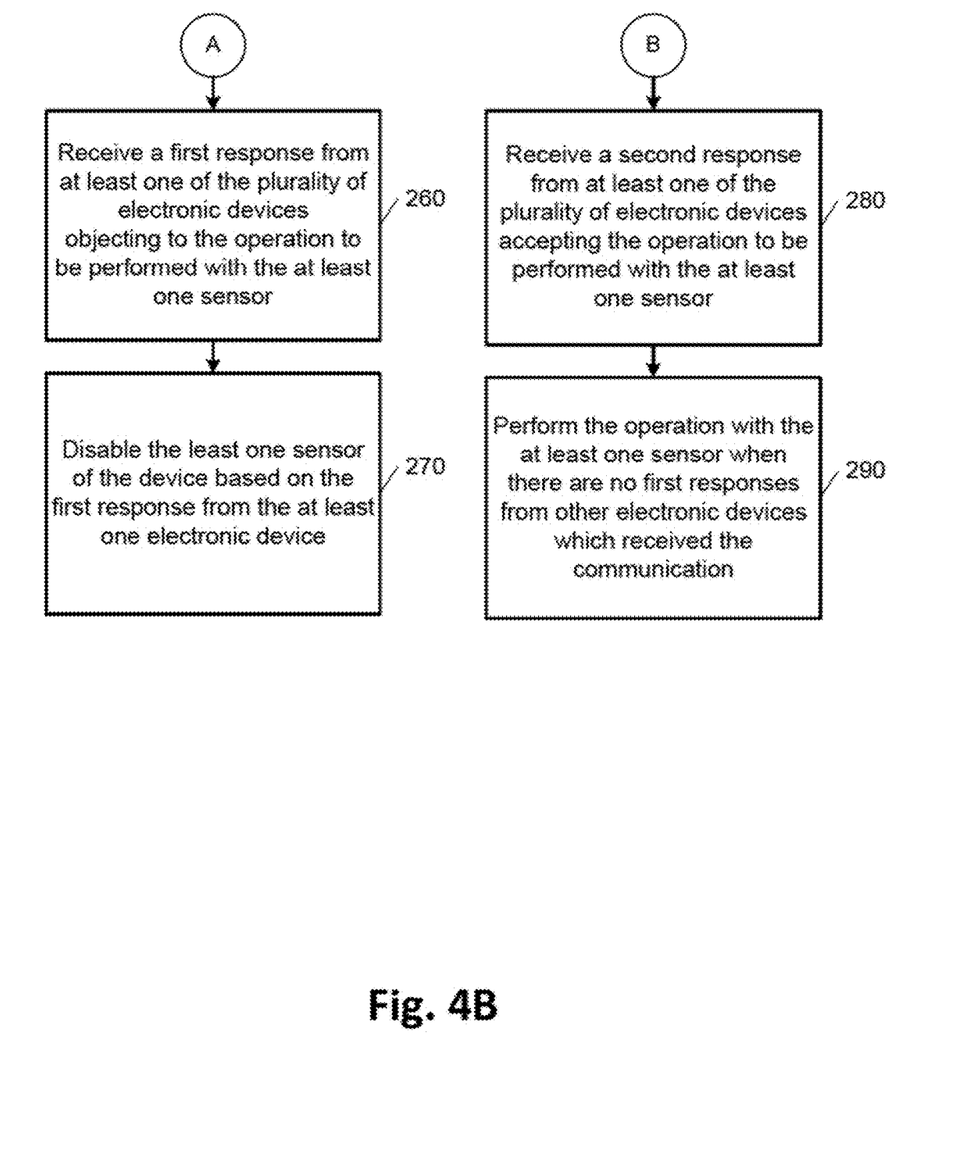

FIGS. 4A and 4B illustrate a flow chart showing an example of an alternative method 200 for privacy protection using a privacy zone. In one example, the method 200 can be executed by the system 5 that includes the electronic device 10. The method 200 may be executed with the privacy data processing module 39, the distance calculation module 40, and the orientation and sensor control module 41, where these modules are implemented with electronic circuitry used to carry out the functionality described below. Various elements or blocks described herein with respect to the method 200 are capable of being executed simultaneously, in parallel, or in an order that differs from the illustrated serial manner of execution. It is to be understood that the method 200 may be implemented by the electronic device 10 or any other electron device.

The method 300 begins at 210, where the electronic device 10 is to process information from a plurality of electronic devices. The information includes at least location data, privacy zone data, and privacy distance data for each of the plurality of electronic devices. The techniques of block 210 are similar to processes described in relation to block 110 of the method 100. This step may be performed by the privacy data processing module 39. As described above, the device 10 may process and store data related to the plurality of protected electronic devices in a database.

At 220, the electronic device 10 compares a current distance between the device 10 and a predetermined privacy distance for each of the plurality of electronic devices. The techniques of block 220 are similar to processes described in relation to blocks 120 and 130 of the method 100. Next, the electronic device 10 determines the orientation of at least one sensor 25 of the device 10 in relation to a privacy one of each of the plurality of electronic devices when the current distance is less than or equal to the privacy distance for that electronic device (at 230). In other words, the electronic device 10 proceeds to determine the orientation of a sensor 25 in relation to at least one protected device of the plurality of devices for a plurality of devices when the current distance is less than or equal to the privacy distance). The techniques of block 230 are similar to processes described in relation to block 140 of the method 100.

At 240, the electronic device 10 sends a communication informing of an operation to be performed with the at least one sensor to each of the plurality of electronic devices when the at least one sensor points at the privacy zone of that electronic device. In other words, when the electronic device 10 determines that at least of the sensors 25 points at a privacy zone of a protected device (or a plurality of devices), the electronic device 10 may send a communication (e.g., message, etc.) to that device (or plurality of devices). The communication may inform the protected devices that the electronic device 10 is about to perform a recording operation (e.g., take a picture, record a video, etc.). For example, a message box may appear on the display of the protected devices and may include the following information: "A device is about to take a picture in your privacy, zone. Do you agree?"

The users of the protected devices may provide a response to the communication from the electronic device 10. For example, the message box may provide the user with options to select "yes," "no," "ignore," etc. by clicking on displayed icons. At 250, the electronic device 10 determines whether the user of the device(s) that received the communication objects to the recording operation. In one implementation, the electronic device 10 may receive a response from at least one of the plurality of protected electronic devices objecting to the operation to be performed with the at least one sensor of the device 10 (at 260). In that situation, the electronic device 10 may disable the least one sensor 25 of the device 10 based on the response from the at least one protected electronic device (at 270). The techniques of block 270 are similar to processes described in relation to block 150 of the method 100.

In another implementation, the electronic device 10 may receive a response from at least one of the plurality of protected electronic devices accepting the operation to be performed with the at least one sensor 25 (at 280). For example, if a friend or family member is trying to take a photo of a user of the protected device, that user may approve the recording operation. In that situation, the electronic device 10 may perform the operation with the at least one sensor 25 when there are no other objecting responses from other electronic devices which received the communication. In other words, if two protected device are close to one another and their privacy zones intersect, an objection by one of these devices may disable the sensor(s) 25 of the device 10 even if the other device agrees to the recording operation. Alternatively, if one of the protected devices "ignores" the message and the second device "agrees" to the recording operation, the electronic device 10 may perform the operation with the at least one sensor 25.

What is claimed is:

1. A method, comprising:
    receiving and processing information from a first electronic device, wherein the information includes at least location data, privacy zone data, and privacy distance data of the first electronic device;
    calculating a current distance between the first electronic device and a recording sensor of a second electronic device;
    comparing the current distance with a privacy distance retrieved from the privacy distance data for the first electronic device;
    determining an orientation of the recording sensor of the second electronic device when the current distance is less than or equal to the privacy distance, wherein the orientation is determined in relation to a privacy zone of the first electronic device, wherein the privacy zone defines an area around the first electronic device and the area has a radius included in the privacy zone data, wherein the privacy distance is greater than the radius; and
    disabling the recording sensor of the second electronic device when the recording sensor is oriented to point within the privacy zone of the first electronic device.

2. The method of claim 1, further comprising calculating, at the second electronic device, privacy boundary vectors to define the area of the privacy zone around the first electronic device based on the location data of the first electronic device, a location of the second electronic device, and the radius of the privacy zone.

3. The method of claim 1, wherein the privacy distance includes a distance between a first end of the radius of the privacy zone and the recording sensor of the second electronic device.

4. The method of claim 2, wherein determining an orientation of the recording sensor of the second electronic device includes calculating an orientation vector for the recording sensor of the second electronic device.

5. The method of claim 4, wherein calculating the orientation vector includes determining a fixed magnitude of the orientation vector in relation to the privacy boundary vectors that define the area of the privacy zone.

6. A system comprising:
    a device having at least one processor with a control unit to:
        process information from a plurality of electronic devices, wherein the information includes at least location data, privacy zone data, and privacy distance data for each of the plurality of electronic devices;
        compare a current distance between the device and a privacy distance for each of the plurality of electronic devices;
        determine an orientation of a recording sensor of the device in relation to a privacy zone of each of the plurality of electronic devices when the current distance is less than or equal to the privacy distance for that electronic device, wherein the privacy zone defines an area around each of the plurality of electronic devices, the area having a radius included in the privacy zone data, wherein the privacy distance is greater than the radius; and
        send a communication informing of an operation to be performed with the recording sensor to each of the plurality of electronic devices when the recording sensor points at the privacy zone of that electronic device.

7. The system of claim 6, wherein the control unit is further to:
    receive a first response from at least one of the plurality of electronic devices objecting to the operation to be performed with the recording sensor; and
    disable the recording sensor of the device based on the first response from the at least one electronic device.

8. The system of claim 7, wherein the control unit is further to:
- receive a second response from at least one of the plurality of electronic devices accepting the operation to be performed with the recording sensor; and
- perform the operation with the recording sensor when there are no first responses from other electronic devices which received the communication.

9. The system of claim 8, wherein the privacy distance includes a distance between a first end of the radius for each of the plurality of electronic devices and the recording sensor of the device.

10. The system of claim 9, wherein the control unit is further to:
- calculate privacy boundary vectors to define the area of the privacy zone around each of the plurality of electronic devices based on the location of each of the plurality of electronic devices, the radius of the privacy zone of each of the plurality of electronic devices, and a location of the device; and
- determine a fixed magnitude of an orientation vector for the recording sensor in relation to the privacy boundary vectors that define the area of the privacy zone for each of the plurality of electronic devices.

11. A non-transitory machine-readable storage medium encoded with instructions executable by at least one processing device, the machine-readable storage medium comprising instructions to:
- process data related to a plurality of electronic devices, wherein the data includes at least location data, privacy zone data, and privacy distance data for each of the plurality of electronic devices;
- compare a current distance between a recording sensor of a first electronic device and the plurality of electronic devices with a privacy distance for each of the plurality of electronic devices that is retrieved from the privacy distance data;
- calculate a privacy zone for each of the plurality of electronic devices based on the location data, the privacy zone data for each of the plurality of electronic devices, and the location data of the first electronic device, wherein the privacy zone defines an area around each of the plurality of electronic devices, the area having a radius included in the privacy zone data, wherein the privacy distance is greater than the radius;
- determine whether an orientation vector for the recording sensor of the first electronic device points at the privacy zone of at least one of the plurality of electronic devices, when the current distance is less than or equal to the privacy distance; and
- disable the recording sensor of the first electronic device when the orientation vector points at the privacy zone of any of the plurality of electronic devices.

12. The non-transitory machine-readable storage medium of claim 11, wherein the privacy distance includes a distance between a first end of the radius for each of the plurality of electronic devices and the recording sensor of the device.

13. The non-transitory machine-readable storage medium of claim 11, further comprising instructions to enable the recording sensor of the first electronic device when the orientation vector points at the privacy zone, but the current distance is greater than the privacy distance.

14. The non-transitory machine-readable storage medium of claim 13, further comprising instructions to:
- calculate privacy boundary vectors to define the area of the privacy zone around each of the plurality of electronic devices based on the location of each of the plurality of electronic devices, the radius of the privacy zone of each of the plurality of electronic devices, and a location of the device; and
- determine a fixed magnitude of an orientation vector for the recording sensor of the first electronic device in relation to the privacy boundary vectors that define the area of the privacy zone for each of the plurality of electronic devices.

* * * * *

UNITED STATES PATENT AND TRADEMARK OFFICE
CERTIFICATE OF CORRECTION

PATENT NO. : 10,083,319 B2  
APPLICATION NO. : 15/111538  
DATED : September 25, 2018  
INVENTOR(S) : Edward Joseph Wilmes

Page 1 of 1

It is certified that error appears in the above-identified patent and that said Letters Patent is hereby corrected as shown below:

In the Drawings

In sheet 5 of 5, Fig. 4B, reference numeral 270, Line 1, delete "least" and insert -- at least --, therefor.

Signed and Sealed this  
Eighth Day of January, 2019

Andrei Iancu  
*Director of the United States Patent and Trademark Office*